United States Patent [19]

Calcagno, Jr.

[11] Patent Number: 4,516,326
[45] Date of Patent: May 14, 1985

[54] ELECTRONIC DEPTH GAGE

[75] Inventor: Vincent J. Calcagno, Jr., Havre de Grace, Md.

[73] Assignee: The United States of America as represented by the Secretary of the Army, Washington, D.C.

[21] Appl. No.: 570,276

[22] Filed: Jan. 12, 1984

[51] Int. Cl.³ .................... G01B 7/26; G01B 7/28
[52] U.S. Cl. .................. 33/169 B; 33/172 E; 33/542; 33/558
[58] Field of Search .......... 33/174 P, 174 L, 172 E, 33/169 R, 169 B, 1 M

[56] References Cited

U.S. PATENT DOCUMENTS

| | | | |
|---|---|---|---|
| 3,208,151 | 9/1965 | Rawstron | 33/174 P |
| 3,241,243 | 3/1966 | Speer | 33/1 M |
| 3,250,012 | 5/1966 | Hilton et al. | 33/174 L |
| 3,639,993 | 2/1972 | Sartorio | 33/174 L |
| 3,749,501 | 7/1973 | Wieg | 33/1 M |

Primary Examiner—Willis Little
Attorney, Agent, or Firm—Anthony T. Lane; Robert P. Gibson; Michael C. Sachs

[57] ABSTRACT

There is disclosed an electromechanical device which uses a digital depth gage micrometer with a probe in combination with a read-out voltmeter to provide automatically recordable profiles of impacted crater sections. The circuit electrically connected to the voltmeter has a Zener circuit which transposes the mechanical movement of the probe to readable and recordable electronic signal information. In one example of its use the recorded data refer to the profile of an exploded metallic crater formed by the impact of a shaped-charge ballistic warhead.

3 Claims, 2 Drawing Figures

ELECTRONIC DEPTH GAGE

GOVERNMENT RIGHTS

The invention described herein may be manufactured, used and licensed by or for the Government for Governmental purposes without the payment to me of any royalties thereon.

BACKGROUND OF THE INVENTION

This invention relates to an electromechanical device which utilizes a digital depth gage micrometer in combination with a read-out voltmeter to provide automatically recordable profiles of impacted crater sections.

Presently used devices for measuring depths less than 500 mm are mechanical depth gage micrometers. These known devices are very accurate, but are inconvenient and difficult to use when a large number of measurements, e.g. on the order of 5,000 or more, is required to determine the topographical profile of an impacted crater section.

BRIEF SUMMARY OF THE INVENTION

This invention is an electromechanical device comprising a digital depth gage micrometer electrically and mechanically coupled in combination with a digital read-out voltmeter. The invention provides automatically recordable profiles of impacted crater sections and is therefore useful, for example, in the measurement and damage assessment due to the explosion of shaped charge warheads in rolled homogeneous armor.

DETAILED DESCRIPTION OF THE INVENTION

Figure 1:
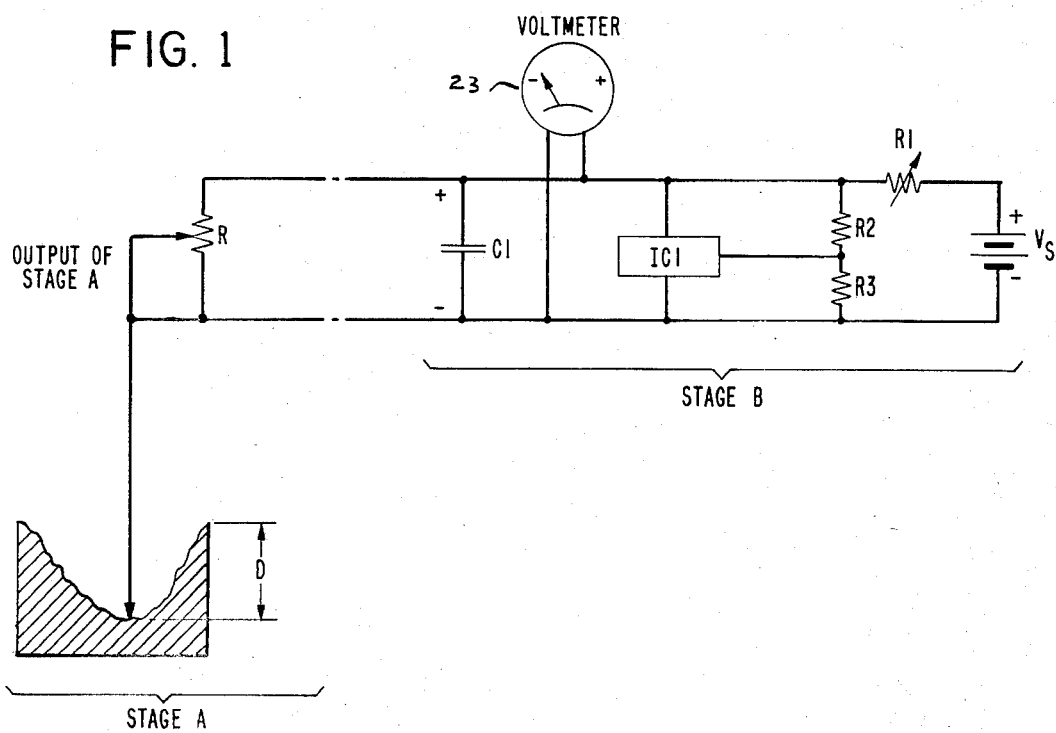
FIG. 1 is an electrical schematic drawing of the circuit of this invention.

The invention can best be understood by reference to the drawings. In FIG. 1, the depth measurement D is converted to voltage, the output of which in FIG. 1, Stage A, is changed by a linearly varying resistance R. The value of D is determined by the position of a probe 10, shown in FIG. 2, in the framework 21 holding the probe 10.

A second stage, Stage B depicted in FIG. 1, is a precision voltage reference. The essential element of Stage B is an adjustable shunt Zener regulator ICI. The output of Stage B is set by three resistors, variable resistor $R_1$ and fixed resistors $R_2$ and $R_3$ and the supply voltage $V_s$.

It is a feature of this invention that the output Stage B remains constant regardless of the usual drain of the supply voltage $V_s$. Thus, the output voltage of Stage B is independent of the input voltage and, because of the interpositioning of the elements shown in FIG. 1, is also independent of the variations in electrical characteristics of the components normally ascribed to temperature excursions in the ambient atmosphere and in the mechanical character of the materials.

The output of Stage B is applied to the positive terminal of a voltmeter 23 and the probe 10 as shown in FIG. 1. Therefore, the output of the measuring stage A depends only on the relation between the distance D, the mechanical probe 10 and the corresponding position at variable resistor R. When calibrated, the output of Stage A and Stage B is the actual measurement in electrical quantity converted from its mechanical equivalent where it can be recorded on a graph by means known in the art.

The capacitor C1 helps eliminate any electrical noise inherent in the circuit. The power to the circuit can be supplied by line voltage or, preferably, by a 9 volt battery which allows the unit to be portable.

Calibration is initially by means of an adjustment to the linearly varying resistor(potentiometer)R.

Although the device of this invention is not limited by its size, in order to be portable, it can be contained in a volume as small as $2'' \times 3'' \times 2\frac{1}{2}''$, with the exception of the probe 10.

Figure 2:
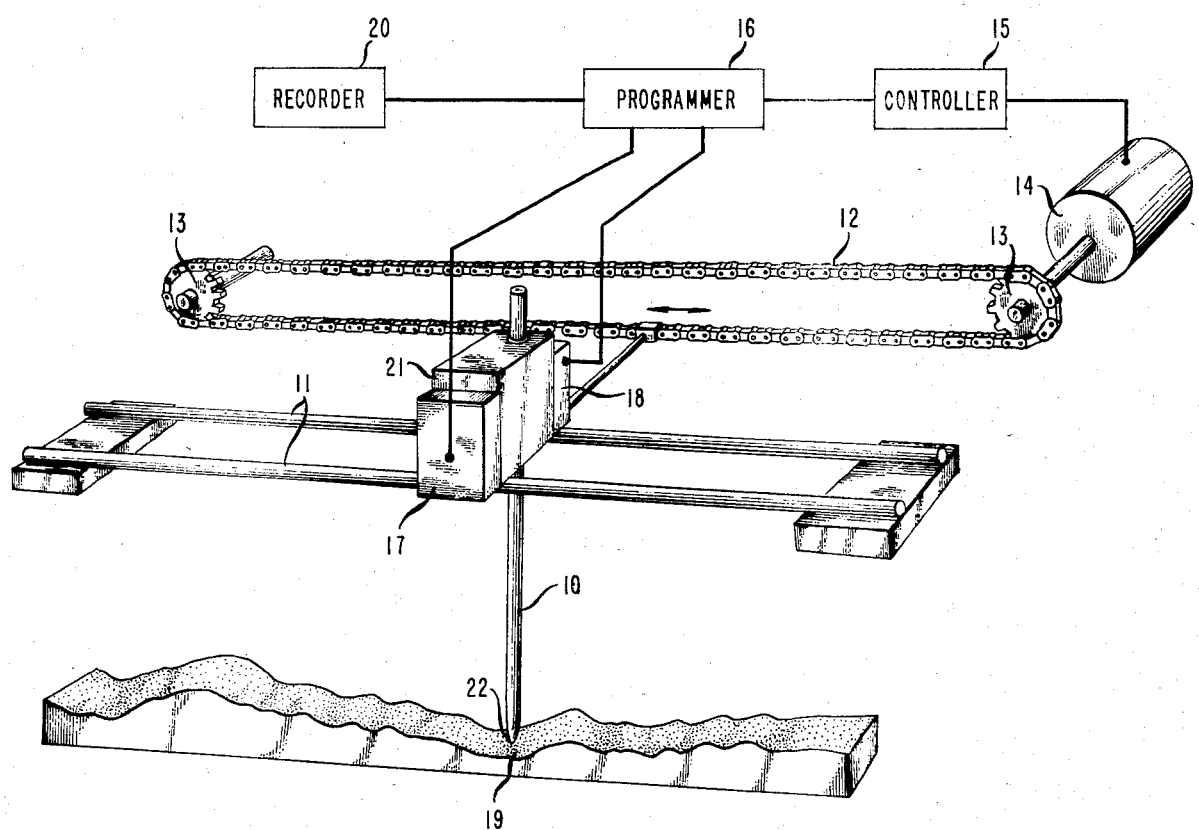
FIG. 2 is a schematic isometric drawing of the electromechanical assembly.

With reference to FIG. 2, the probe 10 comprising a spring loaded shaft, biased downward to contact the cavity 19 being measured, is mechanically restrained in bearings, not shown, to permit vertical motion in a framework 21. Framework 21 is mounted on a rail 11 and is positioned axially by an endless chain 12 which is affixed solidly to the framework 21 and is movable upon command by a programmer 16. The endless chain 12 is gear driven through a sprocket 13 from a stepping motor 14 which responds to a controller 15. The controller 15 is actuated by the programmer 16 via a microswitch 17 signal from the probe 10.

Thus, in operation, the framework 21, which holds the probe 10, also carries a reversible motor 18 which advances the probe 10 to contact the cavity surface 19 whereupon the reversible motor 18 is countersignalled by a microswitch 17 by the probe proximity to the cavity surface 19 to stop advancing and brake. That is, the electrical contact between the probe tip 22 and the cavity surface 19, which electrical contact may be capacitive or inductive, signals the probe motor 18 to brake to a stop. At this juncture, the vertical position of the probe 10 is electrically recorded both digitally and graphically by a recorder 20 as discussed above and described in FIG. 1. A finite delay within the programmer 16 allows this recordation to occur. After another controlled finite delay, the programmer 16 signals the motor 18 to withdraw the probe 10 and move the mechanism along the rail 11 by torque delivery from the stepping motor 14 through the sprocket 13 and endless chain 12. The cycle is then repeated.

The device of this invention, by operating as described above has the following advantages over previous methods and apparatuses. It provides automatic mechanical recording compared to manual transcribing, thus eliminating linear and spherical aberration in reading the scale, ocular and digital fatigue reduction, elimination of transposition error and the reduction in the time required for each measurement. It also permits uniform interpretation of number round-off since this feature is preprogrammable into the system and does not depend on operator judgement. The device can be constructed from existing components, as noted infra, by sequential assembly of the electrical components and is thus economical. The probe 10 is custom designed and carries a proximity switch which is a modified version of those available from Compac Engineering Inc., Paradise, California. The fixed rail 11 is an adaptation of a system available from Setco Industries, Inc., Cincinnati, Ohio. The endless chain 12 and the sprockets 13 are available from Boston Gear Works, Quincy, Massachusetts. The stepping motor 14 is available from Globe Industries, Inc., Dayton, Ohio, and the controller 15-programmer 16-recorder 20 system is available from Burr-Brown, Tuscon, Arizona as a specially tailored assembly.

This invention adapts a Zener circuit in transposing the mechanical movement of the probe 10 into readable and recordable electronic signal information. The recorded data refer to the profile of, e.g. an exploded metallic crater formed by the impact of a shaped-charge ballistic warhead.

I claim:

1. An electromechanical depth gage device comprising a mechanical depth micrometer mechanism with a probe; and an electrical linear resistant circuit which converts depth measurements of said probe to voltage, said circuit comprising a passive stage which responds to movements of said probe including a variable resistor, and an active stage including a Zener circuit; comprising: fixed resistors, a capacitor, a Zener regulator and a voltage source, said linear resistant circuit being operatively connected to a digital readout voltmeter for reading variation in electrical resistance of said variable resistor, as a measure of probed depth position.

2. Apparatus as in claim 1 wherein depth is mechanically sensed by inductive proximity.

3. Apparatus as in claim 1 wherein depth is mechanically sensed by capacitive proximity.

* * * * *